US011997628B2

United States Patent
Keskitalo et al.

(10) Patent No.: US 11,997,628 B2
(45) Date of Patent: May 28, 2024

(54) ADVANCED FREQUENCY SYNCHRONIZATION IN A MOBILE INTEGRATED ACCESS BACKHAUL DEPLOYMENT

(71) Applicant: NOKIA TECHNOLOGIES OY, Espoo (FI)

(72) Inventors: Ilkka Antero Keskitalo, Oulu (FI); Esa Tapani Tiirola, Oulu (FI); Esa Mikael Malkamäki, Espoo (FI); Juha Sakari Korhonen, Espoo (FI); Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/785,204

(22) PCT Filed: Dec. 1, 2020

(86) PCT No.: PCT/EP2020/084074
§ 371 (c)(1),
(2) Date: Jun. 14, 2022

(87) PCT Pub. No.: WO2021/144059
PCT Pub. Date: Jul. 22, 2021

(65) Prior Publication Data
US 2022/0400458 A1   Dec. 15, 2022

Related U.S. Application Data

(60) Provisional application No. 62/960,358, filed on Jan. 13, 2020.

(51) Int. Cl.
*H04W 56/00* (2009.01)

(52) U.S. Cl.
CPC ..... *H04W 56/0035* (2013.01); *H04W 56/001* (2013.01); *H04W 56/004* (2013.01)

(58) Field of Classification Search
None
See application file for complete search history.

(56) References Cited

U.S. PATENT DOCUMENTS

2011/0170527 A1* 7/2011 Yamamoto ........ H04W 56/0035
370/338
2012/0287919 A1* 11/2012 Kim .................. H04W 56/0045
370/350

(Continued)

FOREIGN PATENT DOCUMENTS

GB        2 277 232 A        10/1994

OTHER PUBLICATIONS

The Doppler equation in range and range rate measurement. (Oct. 8, 1965). NASA Technical Reports Server (NTRS). https://ntrs.nasa.gov/citations/19660010159 (Year: 1965).*
International Search Report and Written Opinion dated Feb. 26, 2021 corresponding to International Patent Application No. PCT/EP2020/084074.

(Continued)

*Primary Examiner* — Saad Khawar
(74) *Attorney, Agent, or Firm* — Lippes Mathias LLP (57) ABSTRACT

Implementations of advanced frequency synchronization in a mobile integrated access backhaul deployment are disclosed. An apparatus includes at least one processor, and at least one non-transitory memory including computer program code, wherein the at least one memory and the computer program code are configured to, with the at least one processor, cause the apparatus at least to perform: estimate a change in a propagation delay at two time instants, measure a time period of the two time instants using a local clock of a network node, wherein the two time instants correspond to a known timing of a received signal, subtract the change of the propagation delay from the measured time period, calculate a difference between the (Continued)

subtracted time period and a known timing of the received signal; and convert the difference to a frequency offset value to synchronize downlink transmission frequency between the network node and a parent node.

19 Claims, 5 Drawing Sheets

(56) References Cited

U.S. PATENT DOCUMENTS

2013/0301619 A1   11/2013  Singh et al.
2018/0295596 A1*  10/2018  Zhang .................. H04W 64/006
2021/0400609 A1*  12/2021  Bi ....................... H04W 56/009

OTHER PUBLICATIONS

3GPP TR 38.874 V16.0.0 (Dec. 2018), Technical Report, 3rd Generation Partnership Project; Technical Specification Group Radio Access Network; NR; Study on Integrated Access and Backhaul; (Release 16), Dec. 2018.
Qualcomm, "New WID: Integrated Access and Backhaul for NR," RP-182882, 3GPP TSG RAN Meeting #82, Sorrento, Italy, Dec. 10-13, 2018.
Huawei, "[draft] LS on clarification of OTA timing alignment for IAB," R1-1905841, 3GPP TSG RAN WG1 #96bis, Xi'an, China, Apr. 8-12, 2019.
Qualcomm, "New WID: Integrated Access and Backhaul for NR," RP-182322, 3GPP TSG RAN Meeting #82, Sorrento, Italy, Dec. 10-13, 2018.

* cited by examiner

FIG.5

ADVANCED FREQUENCY SYNCHRONIZATION IN A MOBILE INTEGRATED ACCESS BACKHAUL DEPLOYMENT

TECHNICAL FIELD

The examples and non-limiting embodiments relate generally to communications and, more particularly, to advanced frequency synchronization in a mobile integrated access backhaul deployment.

BACKGROUND

It is known to provide access to a communications network, and to provide a link between a radio node and a core network.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
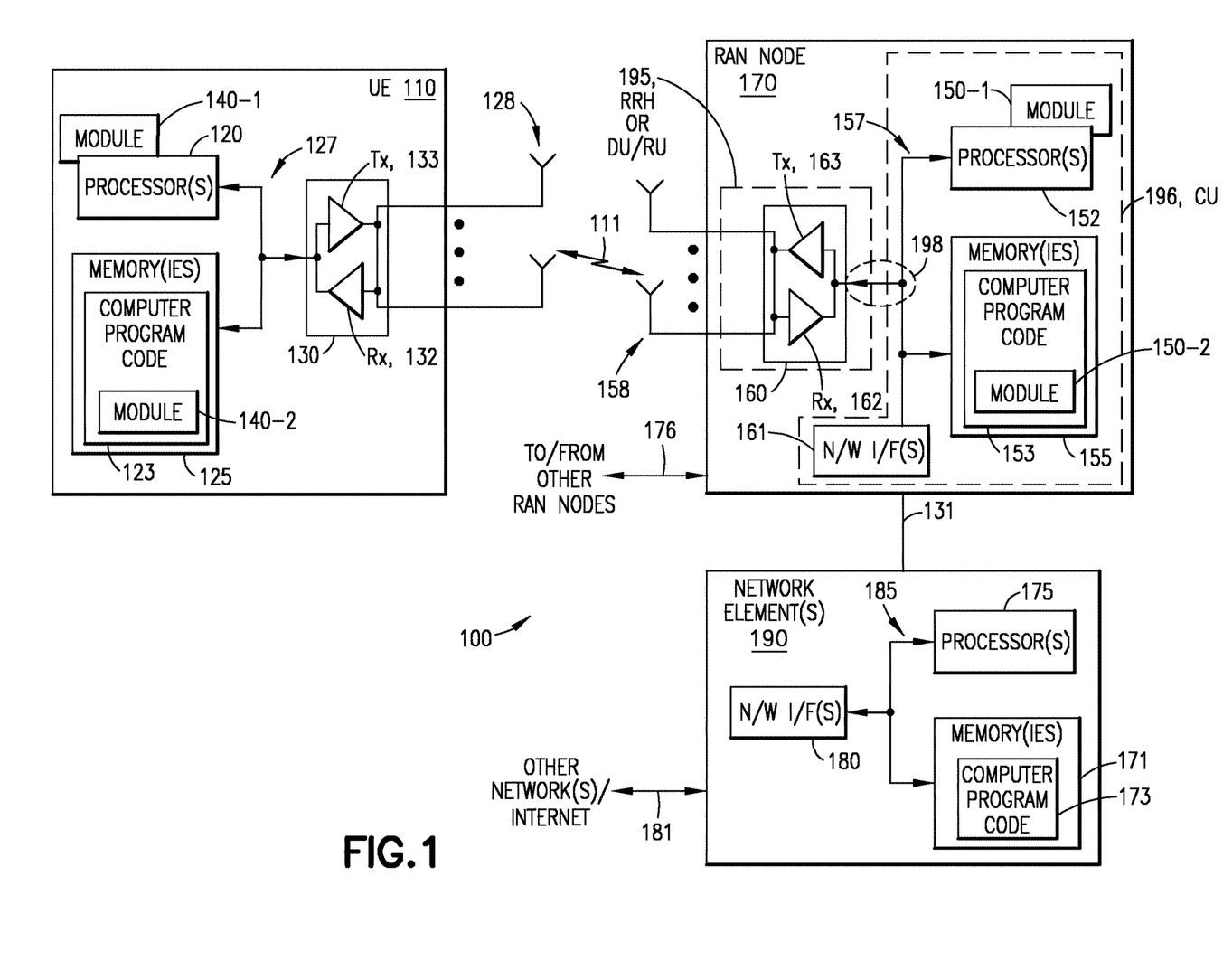
FIG. 1 is a block diagram of one possible and non-limiting system in which the example embodiments may be practiced.

The following acronyms and abbreviations that may be found in the specification and/or the drawing figures are defined as follows:

3GPP third generation partnership project
5G fifth generation
5GC 5G core network
AMF access and mobility management function
BH backhaul
BS base station
CU central unit or centralized unit
D downlink
Δf frequency offset
DL downlink
DU distributed unit
DSP digital signal processor
eMBB enhanced mobile broadband
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
F1 or F1-C interface between CU and DU control interface
FFS for further study
FR1 frequency range 1
gNB (or gNodeB) base station for 5G/NR, i.e., a node providing NR user plane and control plane protocol terminations towards the UE, and connected via the NG interface to the 5GC
GNSS global navigation satellite system
IAB integrated access and backhaul
I/F interface
L2 Layer 2
LTE long term evolution
MAC medium access control
MME mobility management entity
MT mobile termination
ng or NG new generation
ng-eNB or NG-eNB new generation eNB
NGC next generation core
NR new radio (5G radio)
N/W or NW network
OTA over-the-air
PDA personal digital assistant
PDCP packet data convergence protocol
PHY physical layer
RAN radio access network
Rel. release
RF radio frequency
RLC radio link control
RP TSG-RAN meeting
RRC radio resource control
RRH remote radio head
RU radio unit
Rx receiver
RX reception
R1 3GPP group
SDAP service data adaptation protocol
SDM space division multiplexing
SGW serving gateway
SMF session management function
TA timing advance
T_delta RX-TX switching time related parameter (signaled by the parent node)
TDD time division duplex
TDM time division multiplexing
Tg RX-TX switching gap in parent node
$TP_{BH}$ propagation delay between a child and a parent node
TR technical report
TSG technical specifications group
Tx transmitter
TX transmission
UE user equipment (e.g., a wireless, typically mobile device)
UL uplink
UPF user plane function
UTC Coordinated Universal Time
Uu radio interface between the mobile and the radio access network
WI work item
WID work item description Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

The examples disclosed herein relate to integrated access and backhaul (IAB) and more specifically to the synchronization and timing in a mobile IAB deployment. The 3GPP study item on IAB was finished in 2018 and the results are captured in TR 38.874. The work continues aiming for IAB as Rel.16 features in the work item defined RP-182882, (New WID: Integrated Access and Backhaul for NR). Moving relays may be considered for IAB in 3GPP releases beyond Rel.16, likely in Rel.17.

IAB scenarios. The 5G NR shall be able to allow network deployment with minimized manual effort and as automated self-configuration as possible. Especially on higher frequency bands the coverage may be problematic and specific capabilities are needed for NR to enable effortless coverage extensions with minimized or no requirements for network (re-)planning in a fast and cost-effective manner. For these reasons, 3GPP is specifying the IAB solution enabling wireless backhauling for NR sites that do not have fixed (wired/fibre) connection to the network. The usage of wireless connection for the backhaul/fronthaul eliminates the need for cabling of all sites in the deployed network (which can be very dense) which would dramatically reduce the initial deployment costs.

The IAB network is supporting concatenated relaying where the backhaul can be carried over multiple hops from one IAB node to another until the last node serving the access UEs. The serving node providing the BH connection is called a parent node where the node can be either a donor node (with wired network connection), or another IAB node. The served IAB node is called a child node.

Figure 2:
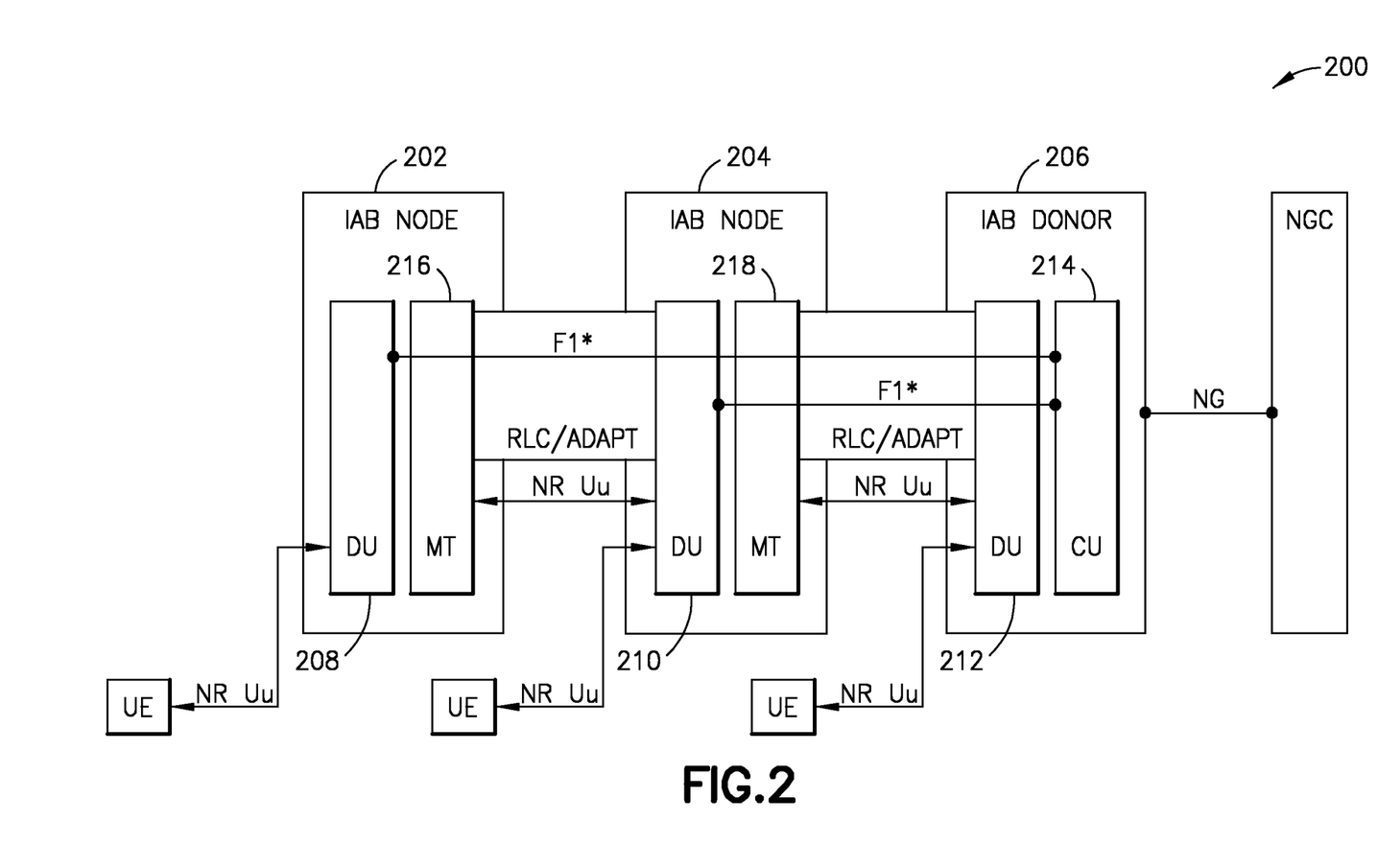
FIG. 2 depicts an example architecture for integrated access and backhaul (IAB).

IAB architecture. There are different options for the IAB architecture. FIG. 2 depicts an example architecture for integrated access and backhaul (IAB). In particular, FIG. 2 shows a high-level architecture 200 for L2 relaying with distributed base station, i.e. gNB, architecture which has been adopted as the basis for normative work in the IAB Work Item (WI), RP-182322.

The donor node 206 hosts the centralized unit (CU) 214 for all IAB nodes, i.e. it runs RRC, higher L2 (PDCP) and control functions for the subtending IAB topology. Distributed units (DUs) (including DU 212) reside at the donor node 206 as well as at each IAB node including IAB node 202 having DU 208 and IAB node 204 having DU 210. The DU hosts lower L2 protocol layers (RLC, MAC) and the physical (PHY) layer. The CU 214 has two control interfaces to the IAB nodes, namely RRC connection to the IAB-MT (including IAB-MT 216 and IAB-MT 218) and F1-C to the IAB-DU (including IAB-DU 208 and IAB-DU 210).

IAB synchronization and timing. The primary use case and deployment of IAB is on TDD bands (esp. on higher frequency bands, i.e. beyond 7 GHz) which typically are unpaired TDD bands. There are opportunities for IAB deployment also in Frequency Range 1 (FR1), i.e. below 7 GHz. TDD operation requires tight synchronization to achieve desired spectrum efficiency targets by minimizing the co-channel interference. Also, IAB nodes are to respect half duplex constraint (in the first releases of IAB specifications) where simultaneous transmission (TX) and reception (RX) is not allowed. To form a synchronized network, IAB nodes have to be synchronized with the donor nodes. For that, two options exist:
  a) Use of absolute time reference, e.g. UTC timing from GNSS reception.
  b) OTA (over the air) synchronization by using the DL RX (by IAB-MT) on the backhaul link as the reference and adjusting the (IAB-DU) DL TX timing based on the timing advance (TA) and parameter T_delta (described below) on the parent link to compensate the propagation delay over the parent BH link.

The option a) is an implementation option and does not have specification impact. However, GNSS receivers may not be implemented e.g. for cost reasons, or the IAB nodes may be deployed in locations where there is no coverage for satellite signals, e.g. deep street canyons or indoors.

Figure 3:
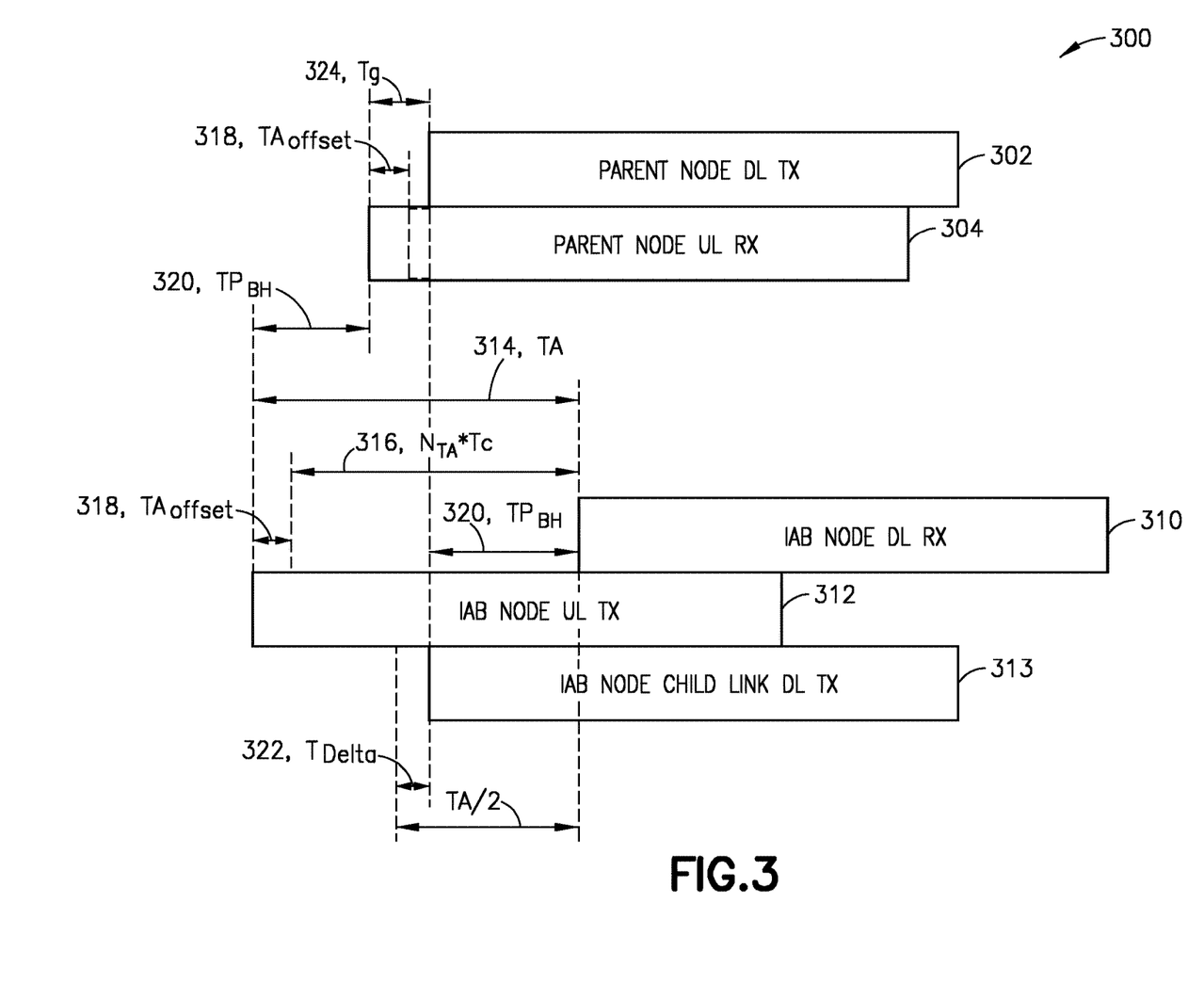
FIG. 3 depicts over the air (OTA) synchronization between parent and child IAB nodes.

To enable synchronization in all scenarios, 3GPP is specifying OTA synchronization (option b). The basic principle of this is illustrated in FIG. 3. FIG. 3 depicts over the air (OTA) synchronization 300 between parent and child IAB nodes.

The goal is to align the DL TX timing of the IAB node and its serving (parent) node. The parent node is used as the "master" and the timing reference and the child node adjusts the DL TX timing to be aligned with the parent. The synchronization procedure is in short the following:

Legacy timing advance (TA) control loop used to set the IAB-MT UL timing
- IAB DL RX timing 310 is used as the reference
- IAB UL TX 312 (to parent node 304) is advanced by the TA 314 ($N_{TA}*T_c$ 316 and TAoffset 318), which is the legacy UE operation. Here $T_c$ is the basic time unit and $N_{TA}$ an integer adjusted by parent node signaled TA commands or autonomously by the IAB node. The constant $TA_{Offset}$ 318 is configurable.

Figure 4:
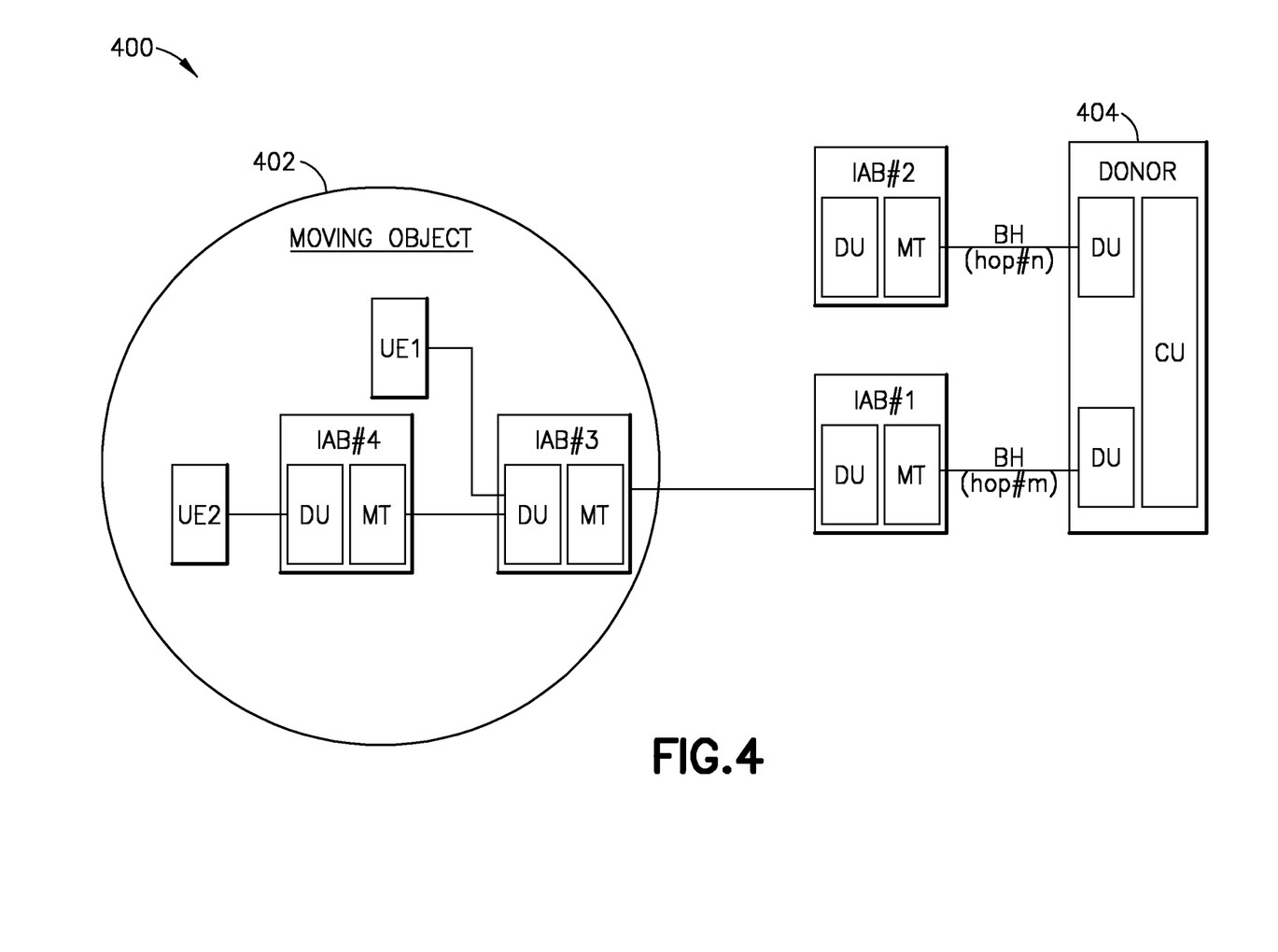
FIG. 4 illustrates an example schematic structure of an IAB network.

IAB-DU TX (DL) timing 313 is offset to the IAB-MT DL RX timing 310
- The offset is (TA/2+T_delta) compensating the propagation delay ($TP_{BH}$ 320) over the BH link
- T_delta 322 (or "$T_{Delta}$" as shown in FIG. 3) is determined and signaled by the parent node to indicate the actual RX-TX switching gap (Tg 324) at the parent node 302
  - T_delta 322 is not known by the IAB node and therefore has to be signaled from the parent node T_delta=(-½)*Tg TA commands can be sent whenever the UL timing is not correct
- T_delta 322 has to be derived and signaled each time the timing and/or new TA 314 value is used Moving IAB scenario. FIG. 4 illustrates an example schematic structure 400 of an IAB network in accordance with the examples described herein. In one non-limiting example, the following assumptions are made:

Assume that DU links under IAB #3 move together with IAB #3, i.e., IAB #4 and UE 1 and UE 2 in the figure are assumed to move together with IAB #3 (as moving object 402). This would correspond e.g. to a situation that IAB #3 provides BH connection for other IAB nodes in the same train and serves also some UEs in the train.

Assume that IAB #3 operates according to half-duplex TDD.

Assume that at some point of time IAB #3 (MT part) performs handover to another IAB node, such as IAB #2 (DU part).

IAB #1 and #2 can have the same or different number of hops to the IAB Donor 404; m=n, or m≠n.

The synchronization principle described above is applicable for fixed/stationary IAB deployment. If the IAB nodes are moving, the propagation delay may vary and therefore, TA commands have to be sent to align the UL timing at the parent node. The timing offset, (TA/2+T_delta), is an estimate of the propagation delay and therefore has to be continuously updated by the parent node.

There are two reasons why the DL RX timing can drift at the IAB node, either i) due to change of the propagation delay, or, ii) due to inaccuracy of the (local) oscillator. The change of the propagation delay on the BH link may not affect the DL synchronization whereas the clock drift due to local oscillator may be compensated in the DL TX to maintain the alignment with the parent node.

Furthermore, the parent node may also be another IAB node which is synchronized to its parent, i.e. grand-parent. This means that the reference frequency and timing may change also at the parent node to which the IAB node may synchronize.

The problem is first of all, how to separate frequency offsets due to Doppler and error in the local clock reference, and how to handle the time/frequency adjustments at the parent node.

Another problem is how to separate the two root causes for the RX timing drift as the required actions depend on the detection of the error cause.

The IAB synchronization for fixed deployment is described e.g. in R1-1905841.

3GPP has not considered time or frequency synchronization when the IAB nodes are moving and when the propagation delay varies.

Certain assumptions for the IAB node implementation may be made. One assumption is that the parent node may be used as the reference to which the IAB node timing and frequency is synchronized. Another is that the IAB-MT and IAB-DU are running with fixed timing using a local oscillator. The oscillator may have a frequency offset according to a specified requirement; with BS requirements the error can be 0.1 (or 0.05) ppm.

The IAB node synchronization to the parent node may distinguish the frequency offsets (and timing drifts therefrom) due to IAB movement (Doppler) and that of the local clock reference. The IAB node may use certain principles to separate the two offsets.

The timing (and frequency reference of the parent node) may be adjusted causing additional changes in the DL timing and frequency. This has to be considered when measuring the timing drifts between $t_1$ and $t_2$. If parent node adjusts its timing by $\Delta t_{parent\_adj}$ (e.g. prolongs or shortens $\Delta t=t_2-t_1$ by some clock cycles), $t_{drift\_ref\_clock}=\Delta t_{parent\_adj}$ would be seen by the child node even with zero frequency offset. Three approaches can be considered for avoiding such an error:

(1) 1-bit signaling with TA update and T_delta indicating if the parent has changed its timing since the earlier TA command. If a change is indicated, the child node does not try to estimate Δf from that TA command interval.

(2) $\Delta t_{parent\_adj}$ is signaled and taken into account by the child node by subtracting it from the child's calculated $t_{drift\_ref\_clock}$: $\Delta f=(t_{drift\_ref\_clock}-\Delta t_{parent\_adj})/\Delta t*f_c$.

(3) the IAB node and parent may be configured with non-overlapping measurement windows in time where adjustment of the local frequency reference is calculated within those windows. Based on this principle, the IAB node can assume that there is no adjustment ongoing at the parent node if the two TA commands that the IAB node received fits within its measurement window.

Approach (1) may be sufficient as the DL timing adjustments may be rare in practice.

To distinguish the time drift due to IAB node movement (Doppler) and offset in the local clock reference, the following procedure may be used to synchronize a parent and a (child) IAB node. In particular, doppler estimation proceeds as follows.

RF propagation delay ($T_P$) is expressed as: $T_P=(N_{TA}*T_c)/2+T\_delta$, where $T\_delta=-T_g/2$. This implies $T_P=(N_{TA}*T_c)/2-T_g/2$. $T_g$=RX-TX actual switching gap at the parent node.

At $t_1$ the IAB node has $N_{TA_1}$ and $T\_delta_1$ signaled by the parent node. $t_1$ can be a time just after receiving TA update and T_delta so that the values of the parameters match closest with the actual propagation delay. $N_{TA1}$ may be adjusted by the IAB node including autonomous corrections.

This value is typically not known to the parent, and the actual value is denoted as $N'_{TA1}$. $N'_{TA1}$ is proportional to the absolute physical distance i.e. it compensates the propagation delay. Propagation delay is calculated as described above.

At $t_2$ IAB node has values $N'_{TA2}$ and $T\_delta_2$. Similarly, the propagation delay is calculated as at $t_1$.

The change in the propagation delay $\Delta T_{Prop} = T_P(t_1) - T_P(t_2)$. $\Delta T_{prop} = [(N'_{TA}(t_1)*T_c)/2 + T\_delta(t_1)] - [(N'_{TA}(t_2)*T_c)/2 + T\_delta(t_2)] = TA_{diff}/2 - T\_delta_{diff}$, where $TA_{diff} = (N'_{TA}(t_1) - N'_{TA}(t_2))*T_c$ is based on signaled TA command(s) and possible IAB node adjustment, and $T\_delta_{diff} = T\_delta(t_1) - T\_delta(t_2)$.

$\Delta T_{prop}$ is the actual time change due to the change of the relative distance to the parent node thus representing the frequency offset due to doppler, denoted as $t_{drift\_D}$: $t_{drift\_D} = \Delta T_{prop}$.

The IAB node estimates the total timing drift ($t_{drift\_total}$) of the RX signal over the period of $\Delta t$ between $t_1$ and $t_2$ using its own local clock as the reference. The exact time drift can be measured over a number of frames/slots of the received DL signal; the start/stop times of the measurement can be at the frame/slot borders to be able to perform accurate measurement. Selected frame/slot borders can be close to $t_1$ and $t_2$ where the $N'_{TA}$ values are valid. Measured time (with the local reference) includes both timing drift due to propagation/doppler ($t_{drift\_D}$) and error of the reference clock $t_{drift\_ref\_clock}$.

The share of timing drift due to offset in the (local) clock reference is $t_{drift\_ref\_clock} = (t_{drift\_total}) - (t_{drift\_D})$. This part of the time drift may be compensated in the IAB-DU DL timing.

Adjustment of the local frequency reference is $\Delta f = t_{drift\_ref\_clock}/\Delta t * f_c$, where fc is the frequency of the local clock reference.

Figure 5:
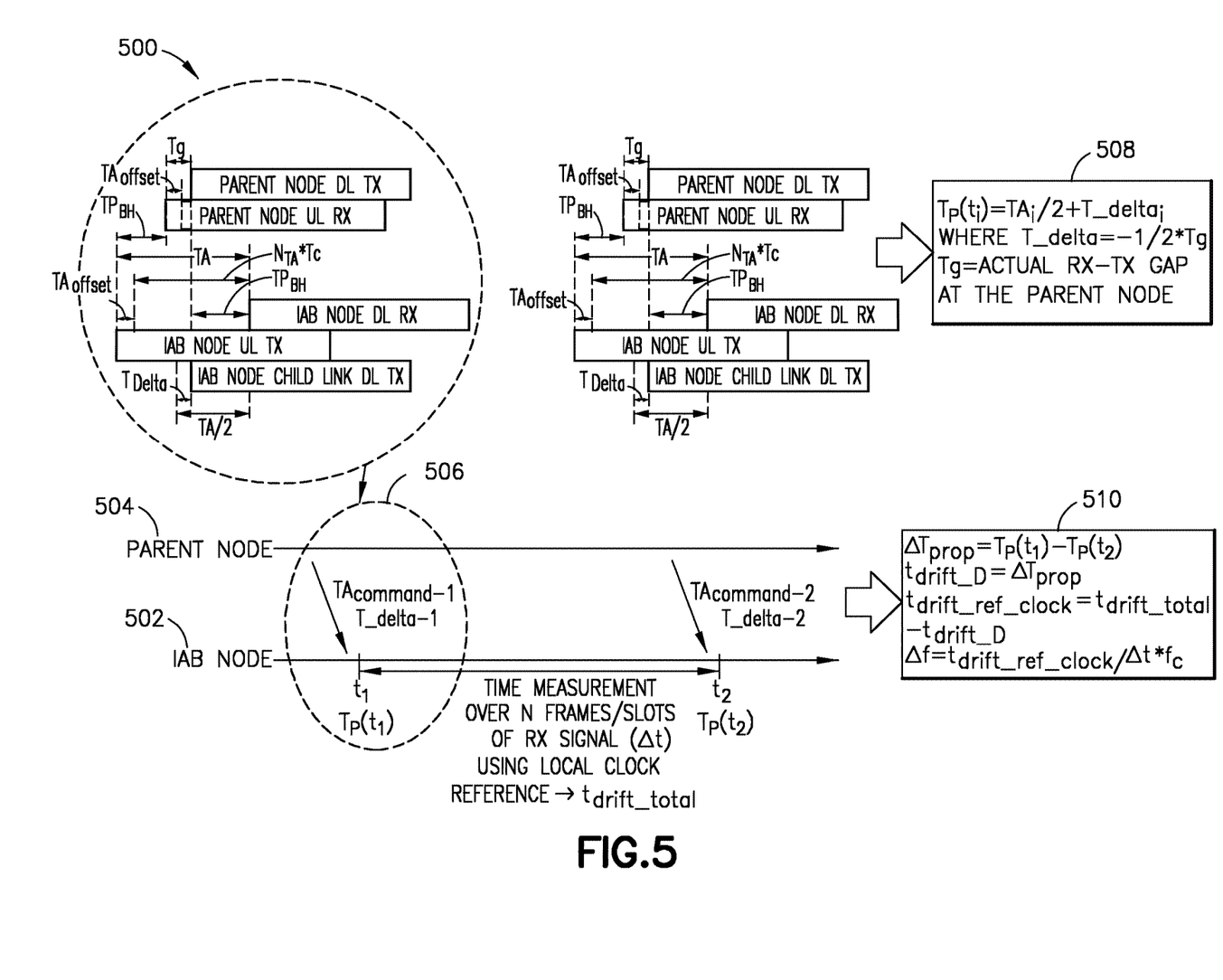
FIG. 5 illustrates the principle of an example frequency offset (Δf) estimation.

FIG. 5 illustrates the principle of an example frequency offset ($\Delta f$) estimation. In particular, FIG. 5 illustrates an embodiment of the principle how to extract the doppler from the frequency offset of the local reference. At time instants $t_1$ and $t_2$ the IAB node 502 has valid TA and T_delta values signaled by the parent node 504. At 506, the IAB node 502 calculates the estimate for the propagation delay ($T_P(t_1)$) based on the timing parameters. Refer to 508 for an example way to calculate $T_P(t_1)$. Also at 506, the IAB node 502 selects a suitable frame or slot border ($t_1$) of the received signal to start time interval measurement using its local clock reference. At a selected frame/slot border ($t_2$) the IAB node 502 stops the measurement. The time difference $t_{drift\_total}$ is the time the IAB node 502 has measured between the time instants with its own local clock which may deviate from the frequency reference at the parent node 504. The absolute time between $t_1$ and $t_2$ may be calculated based on what is known from the selected frame/slot borders, the number of clock cycles that the time may have been, $\Delta t$. The measured time can be represented, for example, as the clock cycles of the local clock reference.

At $t_2$ the IAB node 502 calculates the other estimate for the propagation delay, $T_P(t_2)$. The change $T_P(t_1) - T_P(t_2)$ corresponds to the actual change of the physical distance between the IAB node 502 and the parent node 504. Hence the timing change $t_{drift\_D}$ may be the difference between the propagation delays at $t_1$ and $t_2$, i.e. $T_P(t_1) - T_P(t_2)$, shown at 510 as $\Delta T_{prop}$.

The remaining share of the timing change then represents the part caused by the offset in the local frequency reference ($t_{drift\_ref\_clock}$). This may be calculated by subtracting the change due to mobility ($t_{drift\_D}$) from the measured time change ($t_{drift\_total}$). The frequency offset of the local reference may then become:

$$\Delta f = t_{drift\_ref\_clock}/\Delta t * f_c,$$

where $f_c$ is the frequency of the local clock reference. Refer to 510.

Accordingly, the examples described herein provide a method of mobile IAB synchronization where the IAB node estimates the change in the propagation delay at two time instants and measures the time period of the two time instants using its local clock, where the two time instants correspond to known timing of the received signal, subtracts the change of the propagation delay from the measured time period, calculates a difference between the subtracted time period and known timing of the RX signal and converts the difference to a frequency offset value.

The examples described herein also provide a method of mobile IAB synchronization where the IAB node estimates the frequency offsets both due to IAB movement (Doppler) and due to offset in the local clock reference, and, utilizes the information signaled from the parent node while adjusting its timing and frequency reference, where the information indicates whether the timing and/or frequency has been adjusted at the parent node.

The examples described herein provide several advantages and technical effects. These include enabling accurate IAB synchronization in the mobility scenario, providing an optimized implementation and interaction between IAB MT and IAB DU in order to maintain the network synchronization, and providing an implementation applicable in variety of mobile relaying scenarios with wide scale of velocities.

An example method includes estimating a change in a propagation delay at two time instants; measuring a time period of the two time instants using a local clock of a network node, wherein the two time instants correspond to a known timing of a received signal; subtracting the change of the propagation delay from the measured time period; calculating a difference between the subtracted time period and a known timing of the received signal; and converting the difference to a frequency offset value to synchronize downlink transmission frequency between the network node and a parent node.

The method may further include wherein estimating the change in the propagation delay at two time instants comprises determining a timing offset due to doppler $t_{drift\_D}$ by subtracting a propagation delay $T_P(t_2)$ at a second time instant $t_2$ from a propagation delay $T_P(t_1)$ at a first time instant $t_1$.

The method may further include wherein the propagation delay $T_P(t_1)$ at the first time instant is determined based on a first timing advance value $TA_1$ and a first reception-transmission timing parameter $T\_delta_1$ signaled from a parent node at or near the first time instant, and the propagation delay $T_P(t_2)$ at the second time instant is determined based on a second timing advance value $TA_2$ and a second reception-transmission timing parameter $T\_delta_2$ signaled from the parent node at or near the second time instant.

The method may further include wherein determining the known timing of the received signal comprises estimating a total timing drift $t_{drift\_total}$ of the received signal between the first time instant and the second time instant using a local clock reference of the network node.

The method may further include wherein calculating the difference between the subtracted time period and the known timing of the received signal comprises determining a timing change $t_{drift\_ref\_clock}$ caused by an offset in frequency of a local clock reference by subtracting a time offset due to doppler $t_{drift\_D}$ from the total timing drift $t_{drift\_total}$.

The method may further include wherein the frequency offset value $\Delta f$ of a local clock reference is determined based on the timing change $t_{drift\_ref\_clock}$ caused by the offset in frequency of the local clock reference, the measured time period $\Delta t$ of the two time instants using a local clock of the network node, and a frequency of the local clock reference $f_c$.

The method may further include synchronizing a downlink transmission timing between the network node and the parent node based on the frequency offset value.

The method may further include wherein the frequency offset value $\Delta f$ of the local clock reference is given by the formula $\Delta f = t_{drift\_ref\_clock}/\Delta t * f_c$, wherein $t_{drift\_ref\_clock}$ is a timing change caused by an offset in frequency of the local clock reference, $\Delta t$ is the measured time period of the two time instants using a local clock of the network node, and $f_c$ is a frequency of the local clock reference.

The method may further include wherein: the propagation delay $T_P(t_1)$ at the first time instant $t_1$ is given by the formula $T_P(t_1) = TA_1/2 + T\_delta_1$, wherein $T\_delta_1 = -\frac{1}{2} * Tg$, wherein Tg is a reception-transmission gap at the parent node; and the propagation delay $T_P(t_2)$ at the second time instant $t_2$ is given by the formula $T_P(t_2) = TA_2/2 + T\_delta_2$, wherein $T\_delta_2 = -\frac{1}{2} * Tg$.

The method may further include wherein: $TA_1 = N'_{TA1} * T_c$, wherein $N'_{TA1}$ is an integer adjusted by a first timing advance command signaled by the parent node at the first time instant, and wherein $T_c$ is a basic time unit; and $TA_2 = N'_{TA2} * T_c$, wherein $N'_{TA2}$ is an integer adjusted by a second timing advance command signaled by the parent node at the second time instant.

The method may further include wherein $N'_{TA1}$ and $N'_{TA2}$ are adjusted by the network node during an autonomous correction procedure to generate values $N_{TA1}$ and $N_{TA2}$, respectively, and further comprising filtering of a selection of the first timing advance value $TA_1$ or the first reception-transmission timing parameter $T\_delta_1$, or the second timing advance value $TA_2$ or the second reception-transmission timing parameter $T\_delta_2$.

The method may further include wherein: the first time instant $t_1$ is a time after receiving a first timing advance value $TA_1$ and a first reception-transmission timing parameter $T\_delta_1$, such that the propagation delay $T_P(t_1)$ approximates an actual propagation delay; and the second time instant $t_2$ is a time after receiving a second timing advance value $TA_2$ and a second reception-transmission timing parameter $T\_delta_2$, such that the propagation delay $T_P(t_2)$ approximates the actual propagation delay.

The method may further include wherein the first time instant $t_1$ and the second time instant $t_2$ are selected by the network node.

The method may further include measuring, by the network node, an exact time drift over a number of frames of a received downlink signal.

The method may be performed while the network node is moving.

The method may further include wherein a mobile termination part and a distributed unit part of the network node are running with fixed timing using a local oscillator.

An example method includes estimating, by a network node, a frequency offset due to a network node movement corresponding to doppler; estimating, by the network node, a frequency offset due to an offset in a local clock reference of the network node; utilizing, by the network node, information signaled from a parent node while adjusting a timing reference of the network node; wherein the information signaled from the parent node indicates the timing reference and/or the frequency reference has been adjusted at the parent node; and not adjusting, by the network node, a frequency of the network node based on a timing advance value and a reception-transmission timing parameter in response to the information signaled from the parent node indicating that the parent node has changed a timing of the parent node.

An example method includes estimating, by a network node, a frequency offset due to a network node movement corresponding to doppler; estimating, by the network node, a frequency offset due to an offset in a local clock reference of the network node; utilizing, by the network node, information signaled from a parent node while adjusting a timing reference of the network node; wherein the information signaled from the parent node indicates the timing reference and/or the frequency reference has not been adjusted at the parent node; and adjusting, by the network node, a frequency of the network node based on a timing advance value and a reception-transmission timing parameter in response to the information signaled from the parent node indicating that the parent node has not changed a timing of the parent node.

The method may further include wherein estimating the frequency offset due to the network node movement corresponding to doppler $t_{drift\_D}$ comprises subtracting a propagation delay $T_P(t_2)$ at a second time instant $t_2$ from a propagation delay $T_P(t_1)$ at a first time instant $t_1$.

The method may further include wherein the frequency offset due to the network node movement corresponding to doppler is determined in part based on a propagation delay $T_P(t_1)$ at a first time instant determined based on a first timing advance value $TA_1$ and a first reception-transmission timing parameter $T\_delta_1$ signaled from the parent node at or near the first time instant, and a propagation delay $T_P(t_2)$ at a second time instant determined based on a second timing advance value $TA_2$ and a second reception-transmission timing parameter $T\_delta_2$ signaled from the parent node at or near the second time instant.

The method may further include determining a known timing of a received signal, which determining comprises estimating a total timing drift $t_{drift\_total}$ of the received signal between a first time instant and a second time instant using the local clock reference of the network node.

The method may further include determining a timing change $t_{drift\_ref\_clock}$ caused by the offset in frequency of the local clock reference by subtracting the frequency offset due to doppler $t_{drift\_D}$ from the total timing drift $t_{drift\_total}$.

The method may further include synchronizing the downlink transmission timing between the network node and the parent node based on a frequency offset value $\Delta f$ of the local clock reference.

The method may further include wherein the frequency offset value $\Delta f$ of the local clock reference is determined based on the timing change $t_{drift\_ref\_clock}$ caused by the offset in frequency of the local clock reference, a measured time period $\Delta t$ of two time instants using a local clock of the network node, and a frequency of the local clock reference $f_c$.

The method may further include wherein the frequency offset value $\Delta f$ of the local clock reference is given by the formula $\Delta f = t_{drift\_ref\_clock}/\Delta t * f_c$, wherein $t_{drift\_ref\_clock}$ is a timing change caused by the offset in frequency of the local clock reference, $\Delta t$ is the measured time period of the two time instants using a local clock of the network node, and $f_c$ is a frequency of the local clock reference.

The method may further include wherein: the propagation delay $T_P(t_1)$ at the first time instant $t_1$ is given by the formula $T_P(t_1)=TA_1/2+T\_delta_1$, wherein $T\_delta_1=-\frac{1}{2}*Tg$, wherein Tg is a reception-transmission gap at the parent node; and the propagation delay $T_P(t_2)$ at the second time instant $t_2$ is given by the formula $T_P(t_2)=TA_2/2+T\_delta_2$, wherein $T\_delta_2=-\frac{1}{2}*Tg$.

The method may further include wherein: $TA_1=N'_{TA1}*T_c$, wherein $N'_{TA1}$ is an integer adjusted by a first timing advance command signaled by the parent node at the first time instant, and wherein $T_c$ is a basic time unit; and $TA_2=N'T_{A2}*T_c$, wherein $N'_{TA2}$ is an integer adjusted by a second timing advance command signaled by the parent node at the second time instant.

The method may further include wherein $N'_{TA1}$ and $N'_{TA2}$ are adjusted by the network node during an autonomous correction procedure to generate values $N_{TA1}$ and $N_{TA2}$, respectively, and further comprising filtering of a selection of the first timing advance value $TA_1$ or the first reception-transmission timing parameter $T\_delta_1$, or the second timing advance value $TA_2$ or the second reception-transmission timing parameter $T\_delta_2$.

The method may further include wherein: the first time instant $t_1$ is a time after receiving the first timing advance value $TA_1$ and a first reception-transmission timing parameter $T\_delta_1$, such that the propagation delay $T_P(t_1)$ approximates an actual propagation delay; and the second time instant $t_2$ is a time after receiving the second timing advance value $TA_2$ and a second reception-transmission timing parameter $T\_delta_2$, such that the propagation delay $T_P(t_2)$ approximates the actual propagation delay.

The method may further include wherein the first time instant $t_1$ and the second time instant $t_2$ are selected by the network node.

The method may further include measuring, by the network node, an exact time drift over a number of frames of a received downlink signal.

The method may be performed while the network node is moving.

The method may further include wherein a mobile termination part and a distributed unit part of the network node are running with fixed timing using a local oscillator.

The method may further include adjusting a frequency reference of the network node based on information signaled from the parent node.

The method may further include wherein the indication of whether the timing reference and/or the frequency reference has been adjusted at the parent node is for the parent node's downlink timing change happening between two latest signaling related to a timing advance value and a reception-transmission timing parameter.

The method may further include taking into account, by the network node, a timing change done by the parent node in response to the information signaled from the parent node including an amount of the timing change, wherein the information may be 1-bit or longer.

A method includes transmitting, by a parent node, a first timing advance value and a first reception-transmission timing value at a first time instant; and transmitting, by the parent node, a second timing advance value and a second reception-transmission timing value at a second time instant; signaling, by the parent node, whether the parent node has adjusted its downlink timing between the first timing advance value and the second timing advance value, or between the first reception-transmission timing value and the second reception-transmission timing value, wherein the signaling is performed using the first or second timing advance values, the first or second reception-transmission timing values, or by using a separate message; wherein the values transmitted by the parent node, and signaling by the parent node, are used by a network node to synchronize its downlink transmission timing and frequency with the parent node during movement of the network node.

An apparatus includes at least one processor; and at least one non-transitory memory including computer program code; wherein the at least one memory and the computer program code are configured to, with the at least one processor, cause the apparatus at least to perform: estimate a change in a propagation delay at two time instants; measure a time period of the two time instants using a local clock of a network node, wherein the two time instants correspond to a known timing of a received signal; subtract the change of the propagation delay from the measured time period; calculate a difference between the subtracted time period and a known timing of the received signal; and convert the difference to a frequency offset value to synchronize downlink transmission frequency between the network node and a parent node.

The apparatus may further include wherein estimating the change in the propagation delay at two time instants comprises determining a timing offset due to doppler $t_{drift\_D}$ by subtracting a propagation delay $T_P(t_2)$ at a second time instant $t_2$ from a propagation delay $T_P(t_1)$ at a first time instant $t_1$.

The apparatus may further include wherein the propagation delay $T_P(t_1)$ at the first time instant is determined based on a first timing advance value $TA_1$ and a first reception-transmission timing parameter $T\_delta_1$ signaled from a parent node at or near the first time instant, and the propagation delay $T_P(t_2)$ at the second time instant is determined based on a second timing advance value $TA_2$ and a second reception-transmission timing parameter $T\_delta_2$ signaled from the parent node at or near the second time instant.

The apparatus may further include wherein determining the known timing of the received signal comprises estimating a total timing drift $t_{drift\_total}$ of the received signal between the first time instant and the second time instant using a local clock reference of the network node.

The apparatus may further include wherein calculating the difference between the subtracted time period and the known timing of the received signal comprises determining a timing change $t_{drift\_ref\_clock}$ caused by an offset in frequency of a local clock reference by subtracting a time offset due to doppler $t_{drift\_D}$ from the total timing drift $t_{drift\_total}$.

The apparatus may further include wherein the frequency offset value $\Delta f$ of a local clock reference is determined based on the timing change $t_{drift\_ref\_clock}$ caused by the offset in frequency of the local clock reference, the measured time period $\Delta t$ of the two time instants using a local clock of the network node, and a frequency of the local clock reference $f_c$.

The apparatus may further include wherein the at least one memory and the computer program code are further configured to, with the at least one processor, cause the apparatus at least to perform: synchronize a downlink transmission timing between the network node and the parent node based on the frequency offset value.

The apparatus may further include wherein the frequency offset value $\Delta f$ of the local clock reference is given by the formula $\Delta f=t_{drift\_ref\_clock}/\Delta t*f_c$, wherein $t_{drift\_ref\_clock}$ is a timing change caused by an offset in frequency of the local clock reference, $\Delta t$ is the measured time period of the two time instants using a local clock of the network node, and $f_c$ is a frequency of the local clock reference.

The apparatus may further include wherein: the propagation delay $T_P(t_1)$ at the first time instant $t_1$ is given by the formula $T_P(t_1)=TA_1/2+T\_delta_1$, wherein $T\_delta_1=-½*Tg$, wherein Tg is a reception-transmission gap at the parent node; and the propagation delay $T_P(t_2)$ at the second time instant $t_2$ is given by the formula $T_P(t_2)=TA_2/2+T\_delta_2$, wherein $T\_delta_2=-½*Tg$.

The apparatus may further include wherein: $TA_1=N'_{TA1}*T_c$, wherein $N'_{TA1}$ is an integer adjusted by a first timing advance command signaled by the parent node at the first time instant, and wherein $T_c$ is a basic time unit; and $TA_2=N'_{TA2}*T_c$, wherein $N'_{TA2}$ is an integer adjusted by a second timing advance command signaled by the parent node at the second time instant.

The apparatus may further include wherein $N'_{TA1}$ and $N'_{TA2}$ are adjusted by the network node during an autonomous correction procedure to generate values $N_{TA1}$ and $N_{TA2}$, respectively, and further comprising filtering of a selection of the first timing advance value $TA_1$ or the first reception-transmission timing parameter $T\_delta_1$, or the second timing advance value $TA_2$ or the second reception-transmission timing parameter $T\_delta_2$.

The apparatus may further include wherein: the first time instant $t_1$ is a time after receiving a first timing advance value $TA_1$ and a first reception-transmission timing parameter $T\_delta_1$, such that the propagation delay $T_P(t_1)$ approximates an actual propagation delay; and the second time instant $t_2$ is a time after receiving a second timing advance value $TA_2$ and a second reception-transmission timing parameter $T\_delta_2$, such that the propagation delay $T_P(t_2)$ approximates the actual propagation delay.

The apparatus may further include wherein the first time instant $t_1$ and the second time instant $t_2$ are selected by the network node.

The apparatus may further include wherein the at least one memory and the computer program code are further configured to, with the at least one processor, cause the apparatus at least to perform: measuring, by the network node, an exact time drift over a number of frames of a received downlink signal.

The apparatus may further include wherein the processor causes the apparatus to perform the operations while the network node is moving.

The apparatus may further include wherein a mobile termination part and a distributed unit part of the network node are running with fixed timing using a local oscillator.

An apparatus includes at least one processor; and at least one non-transitory memory including computer program code; wherein the at least one memory and the computer program code are configured to, with the at least one processor, cause the apparatus at least to perform: estimate, by a network node, a frequency offset due to a network node movement corresponding to doppler; estimate, by the network node, a frequency offset due to an offset in a local clock reference of the network node; utilize, by the network node, information signaled from a parent node while adjusting a timing reference of the network node; wherein the information signaled from the parent node indicates the timing reference and/or the frequency reference has been adjusted at the parent node; and not adjust, by the network node, a frequency of the network node based on a timing advance value and a reception-transmission timing parameter in response to the information signaled from the parent node indicating that the parent node has changed a timing of the parent node.

An apparatus includes at least one processor; and at least one non-transitory memory including computer program code; wherein the at least one memory and the computer program code are configured to, with the at least one processor, cause the apparatus at least to perform: estimate, by a network node, a frequency offset due to a network node movement corresponding to doppler; estimate, by the network node, a frequency offset due to an offset in a local clock reference of the network node; utilize, by the network node, information signaled from a parent node while adjusting a timing reference of the network node; wherein the information signaled from the parent node indicates the timing reference and/or the frequency reference has not been adjusted at the parent node; and adjust, by the network node, a frequency of the network node based on a timing advance value and a reception-transmission timing parameter in response to the information signaled from the parent node indicating that the parent node has not changed a timing of the parent node.

The apparatus may further include wherein estimating the frequency offset due to the network node movement corresponding to doppler $t_{drift\_D}$ comprises subtracting a propagation delay $T_P(t_2)$ at a second time instant $t_2$ from a propagation delay $T_P(t_1)$ at a first time instant $t_1$.

The apparatus may further include wherein the frequency offset due to the network node movement corresponding to doppler is determined in part based on a propagation delay $T_P(t_1)$ at a first time instant determined based on a first timing advance value $TA_1$ and a first reception-transmission timing parameter $T\_delta_1$ signaled from the parent node at or near the first time instant, and a propagation delay $T_P(t_2)$ at a second time instant determined based on a second timing advance value $TA_2$ and a second reception-transmission timing parameter $T\_delta_2$ signaled from the parent node at or near the second time instant.

The apparatus may further include wherein the at least one memory and the computer program code are further configured to, with the at least one processor, cause the apparatus at least to perform: determine a known timing of a received signal, which determining comprises estimating a total timing drift $t_{drift\_total}$ of the received signal between a first time instant and a second time instant using the local clock reference of the network node.

The apparatus may further include wherein the at least one memory and the computer program code are further configured to, with the at least one processor, cause the apparatus at least to perform: determine a timing change $t_{drift\_ref\_clock}$ caused by the offset in frequency of the local clock reference by subtracting the frequency offset due to doppler $t_{drift\_D}$ from the total timing drift $t_{drift\_total}$.

The apparatus may further include wherein the at least one memory and the computer program code are further configured to, with the at least one processor, cause the apparatus at least to perform: synchronize the downlink transmission timing between the network node and the parent node based on a frequency offset value $\Delta f$ of the local clock reference.

The apparatus may further include wherein the frequency offset value $\Delta f$ of the local clock reference is determined based on the timing change $t_{drift\_ref\_clock}$ caused by the offset in frequency of the local clock reference, a measured time period $\Delta t$ of two time instants using a local clock of the network node, and a frequency of the local clock reference $f_c$.

The apparatus may further include wherein the frequency offset value $\Delta f$ of the local clock reference is given by the formula $\Delta f = t_{drift\_ref\_clock}/\Delta t * f_c$, wherein $t_{drift\_ref\_clock}$ is a timing change caused by the offset in frequency of the local clock reference, $\Delta t$ is the measured time period of the two time instants using a local clock of the network node, and $f_c$ is a frequency of the local clock reference.

The apparatus may further include wherein: the propagation delay $T_P(t_1)$ at the first time instant $t_1$ is given by the formula $T_P(t_1)=TA_1/2+T\_delta_1$, wherein $T\_delta_1=-\frac{1}{2}*Tg$, wherein Tg is a reception-transmission gap at the parent node; and the propagation delay $T_P(t_2)$ at the second time instant $t_2$ is given by the formula $T_P(t_2)=TA_2/2+T\_delta_2$, wherein $T\_delta_2=-\frac{1}{2}*Tg$.

The apparatus may further include wherein: $TA_1=N'_{TA1}*T_c$, wherein $N'_{TA1}$ is an integer adjusted by a first timing advance command signaled by the parent node at the first time instant, and wherein $T_c$ is a basic time unit; and $TA_2=N'_{TA2}*T_c$, wherein $N'_{TA2}$ is an integer adjusted by a second timing advance command signaled by the parent node at the second time instant.

The apparatus may further include wherein $N'_{TA1}$ and $N'_{TA2}$ are adjusted by the network node during an autonomous correction procedure to generate values $N_{TA1}$ and $N_{TA2}$, respectively, and further comprising filtering of a selection of the first timing advance value $TA_1$ or the first reception-transmission timing parameter $T\_delta_1$, or the second timing advance value $TA_2$ or the second reception-transmission timing parameter $T\_delta_2$.

The apparatus may further include wherein: the first time instant $t_1$ is a time after receiving the first timing advance value $TA_1$ and a first reception-transmission timing parameter $T\_delta_1$, such that the propagation delay $T_P(t_1)$ approximates an actual propagation delay; and the second time instant $t_2$ is a time after receiving the second timing advance value $TA_2$ and a second reception-transmission timing parameter $T\_delta_2$, such that the propagation delay $T_P(t_2)$ approximates the actual propagation delay.

The apparatus may further include wherein the first time instant $t_1$ and the second time instant $t_2$ are selected by the network node.

The apparatus may further include wherein the at least one memory and the computer program code are further configured to, with the at least one processor, cause the apparatus at least to perform: measure, by the network node, an exact time drift over a number of frames of a received downlink signal.

The apparatus may further include wherein the processor causes the apparatus to perform the operations while the network node is moving.

The apparatus may further include wherein a mobile termination part and a distributed unit part of the network node are running with fixed timing using a local oscillator.

The apparatus may further include wherein the at least one memory and the computer program code are further configured to, with the at least one processor, cause the apparatus at least to perform: adjust a frequency reference of the network node based on information signaled from the parent node.

The apparatus may further include wherein the indication of whether the timing reference and/or the frequency reference has been adjusted at the parent node is for the parent node's downlink timing change happening between two latest signaling related to a timing advance value and a reception-transmission timing parameter.

The apparatus may further include wherein the at least one memory and the computer program code are further configured to, with the at least one processor, cause the apparatus at least to perform: take into account, by the network node, a timing change done by the parent node in response to the information signaled from the parent node including an amount of the timing change, wherein the information may be 1-bit or longer.

An apparatus includes at least one processor; and at least one non-transitory memory including computer program code; wherein the at least one memory and the computer program code are configured to, with the at least one processor, cause the apparatus at least to perform: transmit, by a parent node, a first timing advance value and a first reception-transmission timing value at a first time instant; and transmit, by the parent node, a second timing advance value and a second reception-transmission timing value at a second time instant; signal, by the parent node, whether the parent node has adjusted its downlink timing between the first timing advance value and the second timing advance value, or between the first reception-transmission timing value and the second reception-transmission timing value, wherein the signaling is performed using the first or second timing advance values, the first or second reception-transmission timing values, or by using a separate message; wherein the values transmitted by the parent node, and signaling by the parent node, are used by a network node to synchronize its downlink transmission timing and frequency with the parent node during movement of the network node.

An apparatus includes means for estimating a change in a propagation delay at two time instants; means for measuring a time period of the two time instants using a local clock of a network node, wherein the two time instants correspond to a known timing of a received signal; means for subtracting the change of the propagation delay from the measured time period; means for calculating a difference between the subtracted time period and a known timing of the received signal; and means for converting the difference to a frequency offset value to synchronize downlink transmission frequency between the network node and a parent node.

An apparatus includes means for estimating, by a network node, a frequency offset due to a network node movement corresponding to doppler; means for estimating, by the network node, a frequency offset due to an offset in a local clock reference of the network node; means for utilizing, by the network node, information signaled from a parent node while adjusting a timing reference of the network node; wherein the information signaled from the parent node indicates the timing reference and/or the frequency reference has been adjusted at the parent node; and means for not adjusting, by the network node, a frequency of the network node based on a timing advance value and a reception-transmission timing parameter in response to the information signaled from the parent node indicating that the parent node has changed a timing of the parent node.

An apparatus includes means for estimating, by a network node, a frequency offset due to a network node movement corresponding to doppler; means for estimating, by the network node, a frequency offset due to an offset in a local clock reference of the network node; means for utilizing, by the network node, information signaled from a parent node while adjusting a timing reference of the network node; wherein the information signaled from the parent node indicates the timing reference and/or the frequency reference has not been adjusted at the parent node; and means for adjusting, by the network node, a frequency of the network node based on a timing advance value and a reception-transmission timing parameter in response to the information signaled from the parent node indicating that the parent node has not changed a timing of the parent node.

An apparatus includes means for transmitting, by a parent node, a first timing advance value and a first reception-transmission timing value at a first time instant; and means for transmitting, by the parent node, a second timing advance value and a second reception-transmission timing value at a second time instant; means for signaling, by the parent node, whether the parent node has adjusted its downlink timing between the first timing advance value and the second timing advance value, or between the first reception-transmission timing value and the second reception-transmission timing value, wherein the signaling is performed using the first or second timing advance values, the first or second reception-transmission timing values, or by using a separate message; wherein the values transmitted by the parent node, and signaling by the parent node, are used by a network node to synchronize its downlink transmission timing and frequency with the parent node during movement of the network node.

A non-transitory program storage device readable by a machine, tangibly embodying a program of instructions executable by the machine for performing operations is provided, the operations comprising: estimating a change in a propagation delay at two time instants; measuring a time period of the two time instants using a local clock of a network node, wherein the two time instants correspond to a known timing of a received signal; subtracting the change of the propagation delay from the measured time period; calculating a difference between the subtracted time period and a known timing of the received signal; and converting the difference to a frequency offset value to synchronize downlink transmission frequency between the network node and a parent node.

A non-transitory program storage device readable by a machine, tangibly embodying a program of instructions executable by the machine for performing operations is provided, the operations comprising: estimating, by a network node, a frequency offset due to a network node movement corresponding to doppler; estimating, by the network node, a frequency offset due to an offset in a local clock reference of the network node; utilizing, by the network node, information signaled from a parent node while adjusting a timing reference of the network node; wherein the information signaled from the parent node indicates the timing reference and/or the frequency reference has been adjusted at the parent node; and not adjusting, by the network node, a frequency of the network node based on a timing advance value and a reception-transmission timing parameter in response to the information signaled from the parent node indicating that the parent node has changed a timing of the parent node.

A non-transitory program storage device readable by a machine, tangibly embodying a program of instructions executable by the machine for performing operations is provided, the operations comprising: estimating, by a network node, a frequency offset due to a network node movement corresponding to doppler; estimating, by the network node, a frequency offset due to an offset in a local clock reference of the network node; utilizing, by the network node, information signaled from a parent node while adjusting a timing reference of the network node; wherein the information signaled from the parent node indicates the timing reference and/or the frequency reference has not been adjusted at the parent node; and adjusting, by the network node, a frequency of the network node based on a timing advance value and a reception-transmission timing parameter in response to the information signaled from the parent node indicating that the parent node has not changed a timing of the parent node.

A non-transitory program storage device readable by a machine, tangibly embodying a program of instructions executable by the machine for performing operations is provided, the operations comprising: transmitting, by a parent node, a first timing advance value and a first reception-transmission timing value at a first time instant; and transmitting, by the parent node, a second timing advance value and a second reception-transmission timing value at a second time instant; signaling, by the parent node, whether the parent node has adjusted its downlink timing between the first timing advance value and the second timing advance value, or between the first reception-transmission timing value and the second reception-transmission timing value, wherein the signaling is performed using the first or second timing advance values, the first or second reception-transmission timing values, or by using a separate message; wherein the values transmitted by the parent node, and signaling by the parent node, are used by a network node to synchronize its downlink transmission timing and frequency with the parent node during movement of the network node.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus, comprising:
   at least one processor; and
   at least one memory including computer program code;
   wherein the at least one memory and the computer program code are configured to, with the at least one processor, cause the apparatus at least to:
   estimate a change in a propagation delay at two time instants;
   measure a time period of the two time instants using a local clock of a network node, wherein the two time instants correspond to a known timing of a received signal;
   subtract the change in the propagation delay from a measured time period $\Delta t$;
   calculate a difference between a subtracted time period and the known timing of the received signal; and
   convert the difference to a frequency offset value $\Delta f$ to synchronize downlink transmission frequency between the network node and a parent node.

2. The apparatus of claim 1, wherein estimating the change in the propagation delay at two time instants comprises determining a timing offset due to doppler $t_{drift\_D}$ by subtracting a propagation delay $T_P(t_2)$ at a second time instant $t_2$ from a propagation delay $T_P(t_1)$ at a first time instant $t_1$.

3. The apparatus of claim 1, wherein the propagation delay $T_P(t_1)$ at a first time instant $t_1$ is determined based on a first timing advance value $TA_1$ and a first reception-transmission timing parameter $T\_delta_1$ signaled from a parent node at or near the first time instant $t_1$, and the propagation delay $T_P(t_2)$ at a second time instant $t_2$ is determined based on a second timing advance value $TA_2$ and a second reception-transmission timing parameter $T\_delta_2$ signaled from the parent node at or near the second time instant $t_2$.

4. The apparatus of claim 3, wherein: the propagation delay $T_P(t_1)$ at the first time instant $t_1$ is given by the formula $T_P(t_1)=TA_1/2+T\_delta_1$, wherein $T\_delta_1=-1/2*Tg$, wherein Tg is a reception-transmission gap at the parent node; and the propagation delay $T_P(t_2)$ at the second time instant $t_2$ is given by the formula $T_P(t_2)=TA_2/2+T\_delta_2$, wherein $T\_delta_2=-1/2*Tg$.

5. The apparatus of claim 3, wherein:

$TA_1=N'_{TA1}*T_c$, wherein $N'_{TA1}$ is an integer adjusted by a first timing advance command signaled by the parent node at the first time instant $t_1$, and wherein $T_c$ is a basic time unit; and $TA_2=N'_{TA2}*T_c$, wherein $N'_{TA2}$ is an integer adjusted by a second timing advance command signaled by the parent node at the second time instant $t_2$.

6. The apparatus of claim 5, wherein $N'_{TA1}$ and $N'_{TA2}$ are adjusted by the network node during an autonomous correction procedure to generate values $N_{TA1}$ and $N_{TA2}$, respectively, and wherein the at least one memory and the computer program code are further configured to, with the at least one processor, cause the apparatus at least to filter a selection of the first timing advance value $TA_1$ or the first reception-transmission timing parameter $T\_delta_1$, or the second timing advance value $TA_2$ or the second reception-transmission timing parameter $T\_delta_2$.

7. The apparatus of claim 3, wherein the first time instant $t_1$ and the second time instant $t_2$ are selected by the network node.

8. The apparatus of claim 1, wherein determining the known timing of the received signal comprises estimating a total timing drift $t_{drift\_total}$ of the received signal between a first time instant $t_1$ and a second time instant $t_2$ using a local clock reference of the network node.

9. The apparatus of claim 8, wherein calculating the difference between the subtracted time period and the known timing of the received signal comprises determining a timing change $t_{drift\_ref\_clock}$ caused by an offset in frequency of the local clock reference by subtracting a time offset due to doppler $t_{drift\_D}$ from the total timing drift $t_{drift\_total}$.

10. The apparatus of claim 9, wherein the frequency offset value $\Delta f$ of a local clock reference is determined based on the timing change $t_{drift\_ref\_clock}$ caused by the offset in frequency of the local clock reference, the measured time period $\Delta t$ of the two time instants using a local clock of the network node, and a frequency of the local clock reference $f_c$.

11. The apparatus of claim 1, wherein the at least one memory and the computer program code are further configured to, with the at least one processor, cause the apparatus at least to synchronize a downlink transmission timing between the network node and the parent node based on the frequency offset value.

12. The apparatus of claim 1, wherein the frequency offset value $\Delta f$ of the local clock reference is given by the formula $\Delta f=t_{drift\_ref\_clock}/\Delta t*f_c$, wherein $t_{drift\_ref\_clock}$ is a timing change caused by an offset in frequency of the local clock reference, $\Delta t$ is the measured time period of the two time instants using a local clock of the network node, and $f_c$ is a frequency of the local clock reference.

13. The apparatus of claim 1, wherein:

a first time instant $t_1$ is a time after receiving a first timing advance value $TA_1$ and a first reception-transmission timing parameter $T\_delta_1$, such that the propagation delay $T_P(t_1)$ approximates an actual propagation delay; and a second time instant $t_2$ is a time after receiving a second timing advance value $TA_2$ and a second reception-transmission timing parameter $T\_delta_2$, such that the propagation delay $T_P(t_2)$ approximates the actual propagation delay.

14. The apparatus of claim 1, wherein the at least one memory and the computer program code are further configured to, with the at least one processor, cause the apparatus at least to measure, by the network node, an exact time drift over a number of frames of a received downlink signal.

15. The apparatus of claim 1, wherein the operations are performed while the network node is moving.

16. The apparatus of claim 1, wherein a mobile termination part and a distributed unit part of the network node are running with fixed timing using a local oscillator.

17. An apparatus, comprising:

at least one processor; and at least one memory including computer program code;

wherein the at least one memory and the computer program code are configured to, with the at least one processor, cause the apparatus at least to:

estimate, by a network node, a frequency offset due to a network node movement corresponding to doppler;

estimate, by the network node, a frequency offset due to an offset in a local clock reference of the network node;

utilize, by the network node, information signaled from a parent node while adjusting a timing reference of the network node;

wherein the information signaled from the parent node indicates the timing reference and/or the frequency reference has been adjusted at the parent node; and not adjust, by the network node, a frequency of the network node based on a timing advance value and a reception-transmission timing parameter in response to the information signaled from the parent node indicating that the parent node has changed a timing of the parent node, wherein estimating the frequency offset due to the network node movement corresponding to doppler $t_{drift\_D}$ comprises subtracting a propagation delay $T_P(t_2)$ at a second time instant $t_2$ from a propagation delay $T_P(t_1)$ at a first time instant $t_1$.

18. The apparatus of claim 17, wherein the frequency offset due to the network node movement corresponding to doppler $t_{drift\_D}$ is determined in part based on a propagation delay $T_P(t_1)$ at a first time instant determined based on a first timing advance value $TA_1$ and a first reception-transmission timing parameter $T\_delta_1$ signaled from the parent node at the first time instant, and a propagation delay $T_P(t_2)$ at a second time instant determined based on a second timing advance value $TA_2$ and a second reception-transmission timing parameter $T\_delta_2$ signaled from the parent node at the second time instant.

19. An apparatus, comprising:

at least one processor; and at least one memory including computer program code;

wherein the at least one memory and the computer program code are configured to, with the at least one processor, cause the apparatus at least to:

estimate, by a network node, a frequency offset due to a network node movement corresponding to doppler $t_{drift\_D}$;

estimate, by the network node, a frequency offset due to an offset in a local clock reference of the network node;

utilize, by the network node, information signaled from a parent node while adjusting a timing reference of the network node;

wherein the information signaled from the parent node indicates the timing reference and/or the frequency reference has not been adjusted at the parent node; and adjust, by the network node, a frequency of the network node based on a timing advance value and a reception-transmission timing parameter in response to the information signaled from the parent node indicating that the parent node has not changed a timing of the parent node, wherein estimating the frequency offset due to the network node movement corresponding to doppler $t_{drift\_D}$ comprises subtracting a propagation delay $T_P(t_2)$ at a second time instant $t_2$ from a propagation delay $T_P(t_1)$ at a first time instant $t_1$.

* * * * *